United States Patent
Liu et al.

(10) Patent No.: US 11,334,981 B2
(45) Date of Patent: May 17, 2022

(54) METHOD AND APPARATUS FOR DETECTING A SCREEN, AND ELECTRONIC DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Xiaolei Liu, Beijing (CN); Minglei Chu, Beijing (CN); Lili Chen, Beijing (CN); Hao Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 93 days.

(21) Appl. No.: 16/850,778

(22) Filed: Apr. 16, 2020

(65) Prior Publication Data
US 2021/0174489 A1 Jun. 10, 2021

(30) Foreign Application Priority Data
Dec. 4, 2019 (CN) .......................... 201911226410.7

(51) Int. Cl.
*G06T 7/00* (2017.01)
*G06T 7/136* (2017.01)
(Continued)

(52) U.S. Cl.
CPC .............. *G06T 7/0004* (2013.01); *G06T 5/20* (2013.01); *G06T 5/50* (2013.01); *G06T 7/11* (2017.01);
(Continued)

(58) Field of Classification Search
CPC ................ G06K 9/4619; G06K 9/4609; G06T 2207/30121; G06T 5/002; G06T 5/20; G06T 7/0004; G06T 2207/20192
See application file for complete search history.

(56) References Cited

U.S. PATENT DOCUMENTS

| 5,917,935 A | * | 6/1999 | Hawthorne | ........... G02F 1/1303 382/149 |
| 6,983,065 B1 | * | 1/2006 | Akgul | .................. G06K 9/4619 348/125 |

(Continued)

OTHER PUBLICATIONS

J. Qian, W. Li, B. Chen, J. Qian, F. Liu and X. Zhou, "Sub-Pixel Defect Detection for Super Large LCD Images Using Quadrant Gradient Operator," 2018 IEEE 18th International Conference on Communication Technology (ICCT), 2018, pp. 1183-1187, doi: 10.1109/ICCT.2018.8600215. (Year: 2018).*

(Continued)

*Primary Examiner* — Li Liu
(74) *Attorney, Agent, or Firm* — Procopio, Cory, Hargreaves & Savitch LLP

(57) ABSTRACT

A method for detecting a screen is provided, which may improve detection accuracy of defective sub-pixels in the display screen. The method includes: obtaining an image of a screen to be detected; performing Gabor filtering on the image of the screen to be detected to obtain a plurality of Gabor filtered images; performing image fusion on the plurality of Gabor filtered images to obtain a fused image; segmenting the fused image by using different gray thresholds to obtain segmented images; and performing defect detection according to the segmented images to determine whether there is a defective sub-pixel in the screen to be detected. A value range of different gray thresholds is within a gray value range of the fused image.

15 Claims, 5 Drawing Sheets

(51) Int. Cl.
*G06T 7/11* (2017.01)
*G06T 5/20* (2006.01)
*G06T 5/50* (2006.01)

(52) U.S. Cl.
CPC .... *G06T 7/136* (2017.01); *G06T 2207/20221* (2013.01); *G06T 2207/30148* (2013.01)

(56) References Cited

U.S. PATENT DOCUMENTS

| | | | |
|---|---|---|---|
| 2002/0054293 A1* | 5/2002 | Pang | G01N 21/898 356/430 |
| 2009/0196489 A1* | 8/2009 | Le | G01N 21/9503 382/148 |
| 2016/0012759 A1* | 1/2016 | Kim | G01N 21/956 345/89 |
| 2016/0212363 A1* | 7/2016 | Kim | G06T 5/002 |
| 2019/0197678 A1* | 6/2019 | Lu | G02F 1/1309 |
| 2019/0258890 A1* | 8/2019 | Lee | G09G 3/006 |

OTHER PUBLICATIONS

X. Bi, X. Xu and J. Shen, "An automatic detection method of mura defects for liquid crystal display using real Gabor filters," 2015 8th International Congress on Image and Signal Processing (CISP), 2015, pp. 871-875, doi: 10.1109/CISP.2015.7408000. (Year: 2015).*

* cited by examiner

Threshold segmentation is performed on the fused image based on each gray threshold to obtain a plurality of binary images in one-to-one correspondence with the different gray thresholds ~201

At least one defect region is obtained according to the plurality of binary images ~202

An outer bounding polygon of each defect region is obtained ~203

Clustering calculation is performed on the outer bounding polygon to obtain at least one defective image pixel ~204

Defect determination is performed on the at least one defective pixel point to obtain a category of the at least one defective pixel point ~205

FIG. 3

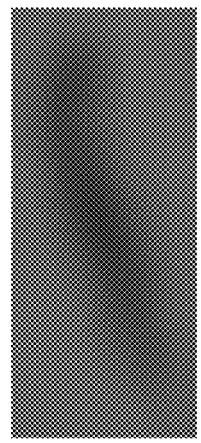

FIG. 4A

METHOD AND APPARATUS FOR DETECTING A SCREEN, AND ELECTRONIC DEVICE

CROSS-REFERENCE TO RELATED APPLICATION

This application claims priority to Chinese Patent Application No. 201911226410.7, filed Dec. 4, 2019, which is incorporated herein by reference in its entirety.

TECHNICAL FIELD

The present disclosure relates to the field of display technologies, and in particular, to a method for detecting a screen, an apparatus for detecting a screen, and an electronic device.

BACKGROUND

With the increasing complexity of semiconductor processes, the production process of the liquid crystal screen has a great impact on display effect of the screen, and sub-pixel defects of the screen may seriously affect visual effect of an image displayed by the screen. Therefore, after a display screen is manufactured, the display screen is detected whether the display screen has a defect, and positions of the defective sub-pixels are located, so that subsequent operations of manual inspection, analysis and the like are performed on the defective sub-pixels.

SUMMARY

In a first aspect, a method for detecting a screen is provided. The method includes: obtaining an image of a screen to be detected; performing Gabor filtering on the image of the screen to be detected to obtain a plurality of Gabor filtered images; performing image fusion on the plurality of Gabor filtered images to obtain a fused image; segmenting the fused image by using different gray thresholds to obtain segmented images; and performing defect detection according to the segmented images to determine whether there is a defective sub-pixel in the screen to be detected. A value range of different gray thresholds is within a gray value range of the fused image.

In some embodiments, performing Gabor filtering on the image of the screen to be detected to obtain a plurality of Gabor filtered images, includes: performing Gabor filtering in a first direction and a second direction on the image of the screen to be detected to obtain a first Gabor filtered image and a second Gabor filtered image, respectively. The first direction is perpendicular to the second direction. A wavelength of a Gabor filter for obtaining the first Gabor filtered image is a number of image pixels between centers of adjacent sub-pixels of the screen to be detected in the first direction. A wavelength of a Gabor filter for obtaining the second Gabor filtered image is a number of image pixels between centers of adjacent sub-pixels of the screen to be detected in the second direction.

In some embodiments, performing image fusion on the plurality of Gabor filtered images to obtain a fused image, includes: performing the image fusion on the first Gabor filtered image and the second Gabor filtered image by a square fusion method. A formula of the square fusion method is, $$I=\sqrt{I_1^2+I_2^2}$$

where I represents a gray value of any image pixel in the fused image, $I_1$ represents a gray value of a corresponding image pixel in the first Gabor filtered image, and $I_2$ represents a gray value of a corresponding image pixel in the second Gabor filtered image.

In some embodiments, segmenting the fused image by using different gray thresholds, includes: performing threshold segmentation on the fused image based on each of the different gray thresholds to obtain a plurality of binary images in one-to-one correspondence with the different gray thresholds. Performing defect detection according to the segmented images to obtain defective sub-pixels in the screen to be detected, includes: obtaining at least one defect region according to the plurality of binary images; obtaining an outer bounding polygon of each defect region; performing clustering calculation on the outer bounding polygon to obtain at least one defective image pixel; and performing defect determination on the at least one defective image pixel to obtain a category of the at least one defective image pixel.

In some embodiments, performing threshold segmentation on the fused image based on each of the different gray thresholds to obtain a plurality of binary images in one-to-one correspondence with the different gray thresholds, includes: obtaining a minimum gray value and a maximum gray value of the fused image: sequentially selecting different gray thresholds between the minimum gray value and the maximum gray value according to a preset step; and performing threshold segmentation on the fused image by using, each of the different gray thresholds to obtain a plurality of binary images. Obtaining at least one defect region according to the plurality of binary images, includes: calculating areas of connected regions in the plurality of binary images; as for any connected region in any binary image, determining whether an area change rate of corresponding connected regions in binary images corresponding to any two adjacent, gray thresholds is less than a preset area change threshold, wherein the area change rate of the corresponding connected regions is a ratio of an absolute value of a difference between an area of a corresponding connected region in a binary image corresponding to a larger gray threshold of the two adjacent gray thresholds and an area of a corresponding connected region in a binary image corresponding to a smaller gray threshold of the two adjacent gray thresholds to the area of the corresponding connected region in the binary image corresponding to the smaller gray threshold of the two adjacent gray thresholds; and if at least one area change rate corresponding to the any connected region is less than the area change threshold, determining that the any connected region is a defect region.

In some embodiments, before determining whether an area change rate of corresponding connected regions in binary images corresponding to any two adjacent gray thresholds is less than a preset area change threshold, obtaining at least one defect region according to the plurality of binary images, further includes: determining whether an area of any connected region in any binary image is less than a preset area threshold; and if yes, as for the connected region, determining whether an area change rate of the corresponding connected regions in binary images corresponding to any two adjacent gray thresholds is less than the preset area change threshold.

In some embodiments, performing threshold segmentation on the fused image by using each of the different gray thresholds to obtain a plurality of binary images, includes: for each gray threshold: as for each image pixel in the fused image, determining whether a gray value of the image pixel is greater than the gray threshold; if the gray value of the image pixel is greater than the gray threshold, setting the gray value of the image pixel as a first gray value; and if the gray value of the image pixel is less than or equal to the gray threshold, setting the gray value of the image pixel as a second gray value.

In some embodiments, performing defect determination on the at least one defective image pixel to obtain a category of the at least one defective image pixel, includes: obtaining a center point gray value of a center image pixel of the outer bounding polygon and corner point gray values of corner image pixels of the outer bounding polygon; calculating an average gray value of the corner point gray values; and determining a relationship between the average gray value and the center point gray value; if the average gray value is less than the center point gray value, determining that the at least one defective image pixel is a bright defective image pixel; and if the average gray value is greater than the center point gray value, determining that the at least one defective image pixel is a dark defective image pixel.

In some embodiments, before segmenting the fused image, the method further includes: obtaining a plurality of adjacent image pixels in a neighborhood range of each image pixel in the fused image by taking the image pixel as a center image pixel; calculating a variance of pixel values of the plurality of adjacent image pixels; and replacing a pixel value of the center image pixel with the variance of pixel values.

In a second aspect, an apparatus for detecting a screen is provided. The apparatus includes a first communication interface and at least one first processor. The first communication interface is configured to receive an image of a screen to be detected. The at least one first processor is configured to: perform Gabor filtering on the image of the screen to be detected to obtain a plurality of Gabor filtered images; perform image fusion on the plurality of Gabor filtered images to obtain a fused image; segment the fused image by using different gray thresholds to obtain a plurality of segmented images; and perform defect detection according to the segmented images to determine whether there is a defective sub-pixel in the screen to be detected. A value range of the different gray thresholds is within a gray value range of the fused image.

In some embodiments, the at least one first processor is configured to perform Gabor filtering in a first direction and a second direction on the image of the screen to be detected to obtain a first Gabor filtered image and a second Gabor filtered image, respectively. The first direction is perpendicular to the second direction. A wavelength of a Gabor filter for obtaining the first Gabor filtered image, is a number of image pixels between centers of adjacent sub-pixels of the screen to be detected in the first direction. A wavelength of a Gabor filter for obtaining the second Gabor filtered image is a number of image pixels between centers of adjacent sub-pixels of the screen to be detected in the second direction.

In some embodiments, the at least one first processor is configured to: perform threshold segmentation on the fused image based on each of the different gray thresholds to obtain a plurality of binary images in one-to-one correspondence with the different gray thresholds; obtain at least one defect region according to the plurality of binary images; obtain an outer bounding polygon of each defect region; perform clustering calculation on the outer bounding polygon to obtain at least one defective image pixel; and perform defect determination on the at least one defective image pixel to obtain a category of the at least one defective image pixel.

In some embodiments, the at least one first processor is configured to: obtain a minimum gray value and a maximum gray value of the fused image; sequentially select different gray thresholds between the minimum gray value and the maximum gray value according to a preset step; perform threshold segmentation on the fused image by using each of the different gray thresholds to obtain a plurality of binary images; calculate areas of connected regions in the plurality of binary images; as for any connected region in any binary image, determine whether an area change rate of corresponding connected regions in binary images corresponding to any two adjacent gray thresholds is less than a preset area change threshold, wherein the area change rate of the corresponding connected regions is a ratio of an absolute value of a difference between an area of a corresponding connected region in a binary image corresponding to a larger gray threshold of the two adjacent gray thresholds and an area of a corresponding connected region in a binary image corresponding to a smaller gray threshold of the two adjacent gray thresholds to the area of the corresponding connected region in the binary image corresponding to the smaller gray threshold of the two adjacent gray thresholds; and if at least one area change rate corresponding to the any connected region is less than the area change threshold, determine that the any connected region is a defect region.

In some embodiments, the at least one first processor is further configured to: determine Whether an area of any connected region in any binary image is less than a preset area threshold before determining whether an area change rate of corresponding connected regions in binary images corresponding to any two adjacent gray thresholds is less than a preset area change threshold; and if yes, as for the connected region, determine whether an area change rate of corresponding connected regions in binary images corresponding to any two adjacent gray thresholds is less than the preset area change threshold.

In some embodiments, the at least one first processor is configured to: for each gray threshold: as for each image pixel in the fused image, determine whether a gray value of the image pixel is greater than the gray threshold; if the gray value of the image pixel is greater than the gray threshold, set the gray value of the image pixel as a first gray value; and if the gray value of the image pixel is less than or equal to the gray threshold, set the gray value of the image pixel as a second gray value.

In some embodiments, the at least one first processor is configured to: obtain a center point gray value of a center image pixel of the outer bounding polygon and corner point gray values of corner image pixels of the outer bounding polygon; calculate an average gray value of the corner point gray values; determine a relationship between the average gray value and the center point gray value; if the average gray value is less than the center point gray value, determine that the at least one defective image pixel is a bright defective image pixel; and if the average gray value is greater than the center point gray value, determine that the at least one defective image pixel is a dark defective image pixel.

In some embodiments, the at least one processor is further configured to: obtain a plurality of adjacent image pixels in a neighborhood range of each image pixel in the fused image by taking the image pixel as a center image pixel; calculate a variance of pixel values of the plurality of adjacent image pixels; and replace a pixel value of the center image pixel with the variance of pixel values.

In a third aspect, an electronic device is provided. The electronic device includes a memory, a second processor and a computer program that is stored in the memory and is executable on the second processor that, when executing the program implements the method for detecting the screen as described in any of the above embodiments.

In a fourth aspect, a non-transitory computer-readable storage medium is provided. The non-transitory computer-readable storage medium stores computer instructions, which are used for causing a computer to execute the method for detecting the screen as described in any of the above embodiments.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art can obtain other drawings according to these drawings without paying any creative effort.

FIG. 3 is a flow diagram of another method for detecting a screen, according to some embodiments;

FIG. 4A is a grayscale diagram of a first defect region, according to some embodiments;

FIG. 6A is a schematic diagram showing exemplary bright defective image pixels;

DETAILED DESCRIPTION

Figure 1:
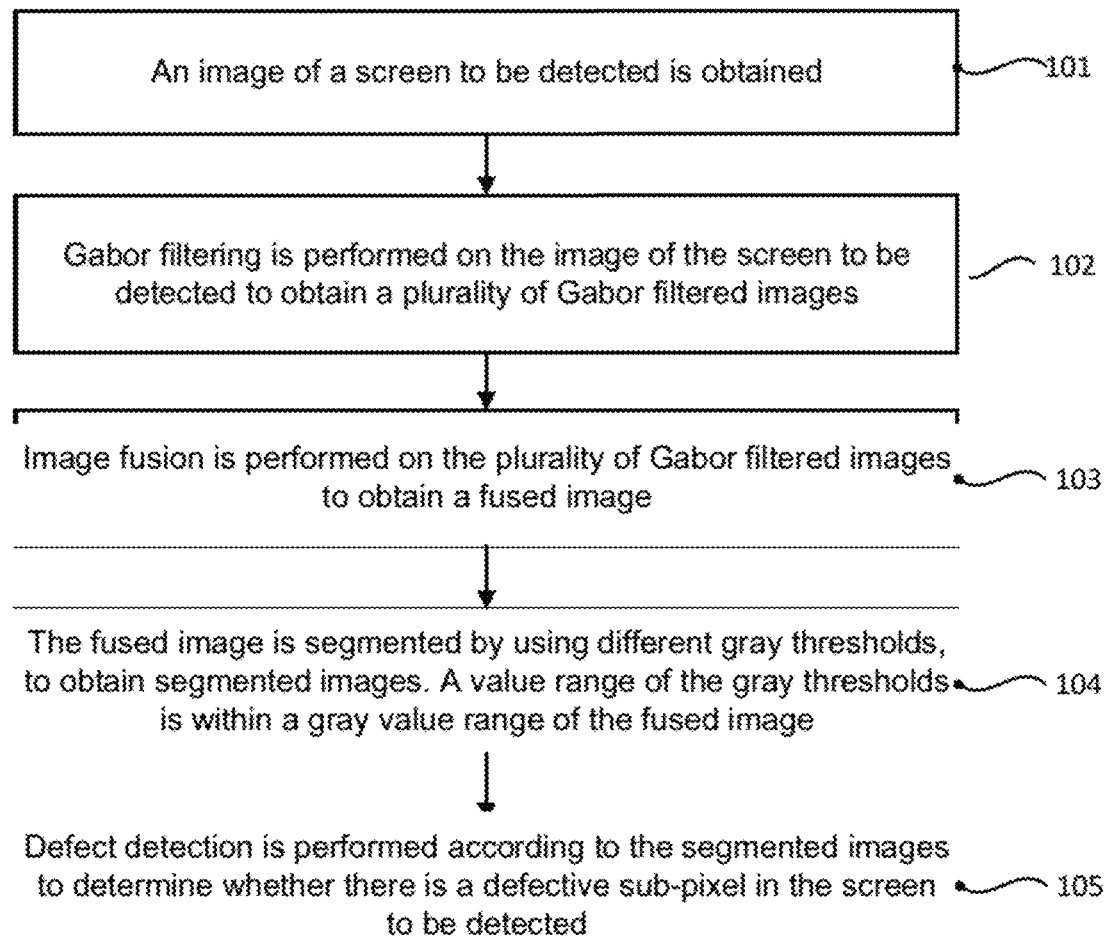
FIG. 1 is a flow diagram of a method for detecting a screen, according to some embodiments.

In order to make objectives, technical solutions, and advantages of the present disclosure clearer, the present disclosure is further described in detail below with reference to exemplary embodiments and the accompanying drawings.

It will be noted that unless otherwise defined, all the technical and scientific terms used herein have the same meanings as commonly understood by one of ordinary skill in the art to which the present disclosure belongs. The words "first", "second" and the like used herein are not intended to mean any order, quantity or importance, but are merely used to distinguish different components. A word "include" or "comprise" or the like means that an element or an item preceding the word covers an element or an item enumerated after the word and its equivalent, without excluding other elements or items. A word "connect", "couple" or a similar word thereof is not limited to physical or mechanical connections, but may include electrical connections, whether direct or indirect. "Upper", "lower", "left", "right", etc. are only used to indicate a relative positional relationship, and when the absolute position of the described object is changed, the relative positional relationship may also be changed accordingly. "A plurality of" means greater than or equal to two.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

In addition, the use of "based on" is meant to be open and inclusive, in that a process, step, calculation, or other action "based on" one or more recited conditions or values may, in practice, be based on additional conditions or value beyond those recited.

In the related art, in a case where a defect in a screen is detected, a segmentation threshold range is firstly obtained based on a photographed image of a non-defective screen, then a gray value range of an image of a screen to be detected is obtained, and then it is determined whether the screen to be detected has a defect according to a comparison result of the segmentation threshold range of the image of the non-defective screen and the gray value range of the image of the screen to be detected. However, when the image of the non-defective screen is photographed, it may be affected by factors such as ambient light intensity and brightness of the screen itself, resulting in that the image of the non-defective screen obtained may have a defect. Therefore, performing defect determination based on the segmentation threshold range of the image of the non-defective screen may result in an inaccurate defect determination result.

Some embodiments of the present disclosure provide a method for detecting a screen. The screen may be applied to a device having a display function. For example, the screen may be applied to portable machines such as calculators, watches, handheld game consoles, mobile phones, pedometers, electronic dictionaries; machines such as word processors, laptops, monitors, copiers, fax machines; household appliances such as LCD TVs, digital cameras, video cameras, multi-function phones, video phones; and other products such as vehicle-mounted instruments, GPS, thermometers, sphygmomanometers, vending machines.

As shown in FIG. 1, the method for detecting the screen includes S101 to S105.

In S101, an image of a screen to be detected is obtained.

Figure 2:
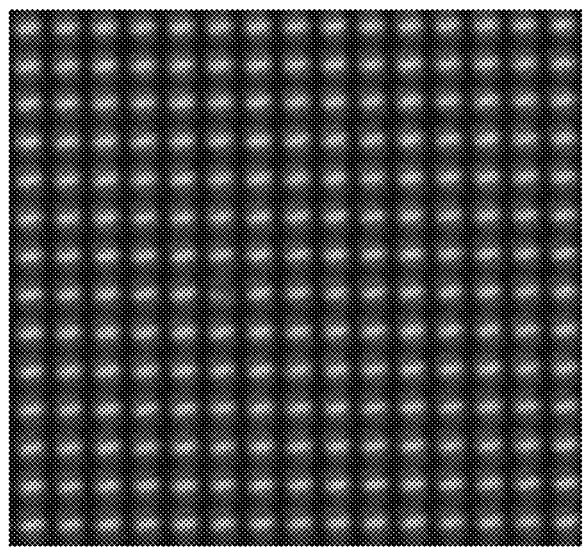
FIG. 2 is a schematic diagram of an image of a screen to be detected according to some embodiments.

For example, the image of the screen to be detected is an image of a screen photographed by an industrial camera. During a photographing process, the screen is in a full bright state (for example, a same driving voltage is applied to all sub-pixels of the screen, so that the sub-pixels all emit light), and then the screen is photographed by a high-resolution industrial camera in a direction perpendicular to a light-exiting surface of the screen, so as to obtain a high-definition image at a sub-pixel level of the screen, as shown in FIG. 2.

In some examples, the sub-pixels of the screen include red sub-pixels, green sub-pixels, and blue sub-pixels.

It will be noted that "image pixel" herein refers to a pixel on an image for composing the image, and "sub-pixel" refers to a sub-pixel in the screen to be detected for display.

In S102, Gabor filtering is performed on the image of the screen to be detected to obtain a plurality of Gabor filtered images.

For example, texture features of the image of the screen to be detected are separated and extracted to obtain the plurality of Gabor filtered images. Since the Gabor filter has a good effect on separating and extracting the texture features, the method for detecting the screen has a good effect on separating and extracting the texture features of the image of the screen to be detected; thereby, a fused image obtained after the subsequent image fusion is performed according to the Gabor filtered images is accurate, and a detection result obtained by performing defect detection according to the fused image is also accurate. That is, an accuracy of defect detection is improved.

In S103, image fusion is performed on the plurality of Gabor filtered images to obtain a fused image.

In S104, the fused image is segmented by using different gray thresholds to obtain segmented images. A value range of the different gray thresholds is within a gray value range of the fused image.

Herein, the description "the value range of the different gray thresholds is within the gray value range of the fused image" means that two endpoint values of the value range of the gray thresholds may be respectively equal to two endpoint values of the gray value range of the fused image, or that two endpoint values of the value range of the gray thresholds differ from corresponding endpoint values of the gray value range of the fused image by a preset value respectively. For example, the gray value range of all image pixels in the fused image is from 150 to 200. The different gray thresholds are 152, 154, . . . , 196, and 198, and a step is 2. A difference between the endpoint value 152 of the value range of the gray thresholds and the endpoint value 150 of the gray value range of the image pixels is a step value, and a difference between the endpoint value 198 of the value range of the gray thresholds and the endpoint value 200 of the gray value range of the image pixels is a step value. In addition, "the value range of the different gray thresholds is within the gray value range of the fused image" may also mean that one endpoint value of the value range of the gray thresholds is equal to a corresponding endpoint value of the gray value range of the fused image, and the other endpoint value of the value range of the gray thresholds differs from a corresponding endpoint value of the gray value range of the fused image by a preset value. Of course, those skilled in the art may set other corresponding manners according to actual situations.

In S105, defect detection is performed according to the segmented images to determine whether there is a defective sub-pixel in the screen to be detected.

In the embodiments of the present disclosure, the defect detection is performed based on the gray thresholds obtained by the fused image itself, which does not need to be compared with the images of another screen. Therefore, the problem that the obtained images of the screen themselves have a difference due to influence of factors such as the ambient light intensity and the brightness of the screen itself to affect the defect detection may be avoided, and the accuracy of screen defect detection may be improved, which may provide a reliable basis for screen quality inspection and subsequent process improvement.

In some embodiments, the S102 of performing Gabor filtering on the image of the screen to be detected to obtain a plurality of Gabor filtered images, includes: performing Gabor filtering in a first direction and a second direction on the image of the screen to be detected to obtain a first Gabor filtered image and a second Gabor filtered image, respectively. The first direction is perpendicular to the second direction. A wavelength of a Gabor filter for obtaining the first Gabor filtered image is the number of image pixels between centers of adjacent sub-pixels of the screen to be detected in the first direction. A wavelength of a Gabor filter for obtaining the second Gabor filtered image is the number of image pixels between centers of adjacent sub-pixels of the screen to be detected in the second direction.

In some examples, the image of the screen to be detected is filtered by separately using, a first Gabor filter and a second Gabor filter to obtain a first Gabor filtered, image and a second Gabor filtered image, respectively. The first direction is a horizontal direction of the image of the screen to be detected (i.e., the horizontal direction of the screen to be detected), and the second direction is a vertical direction of the image of the screen to be detected (i.e., the vertical direction of the screen to be detected). In this case, a filtering angle $\theta_1$ of the first Gabor filter is equal to 90°, and a wavelength of the first Gabor filter is the number of image pixels between centers of two adjacent sub-pixels of the screen to be detected in the horizontal direction. For example, the distance between the centers of two adjacent sub-pixels of the screen to be detected in the horizontal direction corresponds to six image pixels. A filtering angle $\theta_2$ of the second Gabor filter is equal to 0°, and a wavelength of the second Gabor filter is the number of image pixels between centers of two adjacent sub-pixels of the screen to be detected in the vertical direction. For example, the distance between the centers of two adjacent sub-pixels of the screen to be detected in the vertical direction corresponds to six image pixels. That is, the distance between the centers of two adjacent sub-pixels of the screen to be detected in the vertical direction is first determined, and then the number of image pixels corresponding to the distance is determined to be six.

In the related art, an image of a screen to be detected is filtered by using a filtering method with more than two wavelengths in more than two directions to obtain a plurality of filtered images. For example, 12 Gabor filtered images are obtained by using Gabor filters with different wavelengths and different filtering angles, and then the images are fused, which results in inefficient operation of the overall algorithm. However, in the embodiments of the present disclosure, the detection of sub-pixels of the screen may be implemented only through two filtered images, which improves the detection efficiency. In addition, since subsequent steps for detection is based on the fused image itself without being compared with other images, the detection accuracy is not reduced and the detection effect is improved.

In some embodiments, the S103 of performing image fusion on the plurality of Gabor filtered images to obtain a fused image, includes: performing the image fusion on the first Gabor filtered image and the second Gabor filtered image by a square fusion method. A formula of the square fusion method is, $$I=\sqrt{I_1^2+I_2^2}$$

where I represents a gray value of any image pixel in the fused image, $I_1$ represents a gray value of a corresponding image pixel in the first Gabor filtered image, and $I_2$ represents a gray value of a corresponding image pixel in the second Gabor filtered image.

According to the formula, a gray value is calculated for each image pixel of the fused image to obtain the fused image.

The image fusion is performed on the first Gabor filtered image and the second Gabor filtered image by a simple square fusion method. The image fusion method is simple and convenient, and may improve the detection efficiency of the overall image detection algorithm. If necessary, other image fusion methods such as weighted average method, Bayesian estimation method or clustering analysis method may be selected for image fusion.

In some embodiments, as shown in FIG. 3, the S104 of segmenting the fused image by using different gray thresholds, includes: S201, performing threshold segmentation on the fused image based on each of the different gray thresholds to obtain a plurality of binary images in one-to-one correspondence with the different gray thresholds.

In some embodiments, the S201 includes S301 to S303.

In S301, a minimum gray value $M_{min}$, and a maximum gray value $M_{max}$ of the fused image are obtained.

In S302, different gray thresholds $M_1$ to $M_m$ are sequentially selected between the minimum gray value $M_{min}$ and the maximum gray value $M_{max}$ according to a preset step, where m is an integer greater than or equal to 2.

For example, in the gray values of all image pixels in the fused image, the minimum gray value is 150 and the maximum gray value is 200. If the preset step is 2, the gray thresholds are 152, 154, . . . , 196 and 198.

In a case where the preset step is selected to be large, the number of binary images obtained through segmentation will be small, and the operation efficiency of the overall algorithm will be improved. In a case where the preset step is selected to be small, the number of binary images, obtained through segmentation will be large, and the result obtained by subsequent defect determination will be more accurate. Therefore, an appropriate step may be selected according to actual needs, or the step may be adjusted according to needs.

In S303, threshold segmentation is performed on the fused image by using each of the different gray thresholds $M_1$ to $M_m$ to obtain a plurality of binary images $P_1$ to $P_m$.

For example, as for any gray threshold $M_i$ (i is an integer greater than or equal to 1 and less than or equal to m), as for each image pixel in the fused image, it is determined whether a gray value of the image pixel is greater than the gray threshold $M_i$. If the gray value of the image pixel is greater than the gray threshold $M_i$, the gray value of the image pixel is set as a first gray value. If the gray value of the image pixel is less than or equal to the gray threshold $M_i$, the gray value of the image pixel is set as a second gray value. For example, the first gray value is 255 and the second gray value is 0; or the first gray value is 0 and the second gray value is 255. The total number of the selected gray thresholds is m, a binary image is obtained through segmentation based on each gray threshold, and then m binary images are obtained.

In some embodiments, as shown in FIG. 3, the S105 of performing defect detection according to the segmented images to determine whether there is a defective sub-pixel in the screen to be detected, includes S202 to S205.

In S202, at least one defect region is obtained according to the plurality of binary images.

In some examples, the S202 includes S304, S306 and S307. Optionally, the S202 further includes S305 between the S304 and the S306.

In S304, areas of connected regions in the plurality of binary images are calculated.

For example, a connected region is obtained according to the first gray value, and the connected region is a region where gray values of sub-pixels are all the first gray values.

For another example, a connected region is obtained according to the second gray value, and the connected region is a region where gray values of sub-pixels are all the second gray values. Areas of all connected regions in the plurality of binary images are calculated to facilitate subsequent defect determination.

In the S305, it is determined whether an area of any connected region $A_{ij}$ in any binary image $P_i$ is less than a preset area threshold, where j is an integer greater than or equal to 1.

For example, it is determined whether an area of a certain connected region in a binary image corresponding to the gray threshold of 150 is less than the preset area threshold. The preset area threshold may be set according to a size of the binary image, and may also be set according to an area of a common defect. The embodiments of the present disclosure are not limited thereto, as long as the defective sub-pixels in the screen can be detected.

In S306, if the area of the connected region $A_{ij}$ is less than the preset area threshold, as for the connected region $A_{ij}$, it is determined whether an area change rate of corresponding connected regions in binary images corresponding to any two adjacent gray thresholds is less than a preset area change threshold. The area change rate of the corresponding connected regions is a ratio of an absolute value of a difference between an area of a corresponding connected region in a binary image corresponding to a larger gray threshold of the two adjacent gray thresholds and an area of a corresponding connected region in a binary image corresponding to a smaller gray threshold of the two adjacent gray thresholds to the area of the corresponding connected region in the binary image corresponding to the smaller gray threshold of the two adjacent gray thresholds.

For example, if the area of the connected region $A_{ij}$ in the binary image $P_i$ is less than the preset area threshold, it is determined whether the ratio of the absolute value of the difference between the area of the connected region $A_{(i+1)j}$ of the binary image $P_{(i+1)}$ and the area of the connected region $A_{ij}$ of the binary image $P_i$ to the area of the connected region $A_{ij}$ is less than the preset area threshold.

For example, the plurality of gray thresholds are 152, . . . , 198. An area of a first connected region in the binary image corresponding to the gray threshold of 152 is $A_{11}$, the area of a first connected region in the binary image corresponding to the gray threshold of 154 is $A_{21}$, and the area change rate of the two regions is $|A_{21}-A_{11}|/A_{11}$. Then, the area of a first connected region in the binary image corresponding to the gray threshold of 156 is $A_{31}$, and the area change rate is $|A_{31}-A_{21}|/A_{21}$. By analogy, for any connected region, all area change rates are calculated. It will be noted that the three first connected regions have a corresponding position. For example, at least some of coordinate values of the positions of the three first connected regions on their respective binary images are the same.

In some examples, if areas of all connected regions in the plurality of binary images are greater than the preset area threshold, it is determined that there is no defect region in the fused image.

In the S307, if at least one the area change rate corresponding to the connected region $A_{ij}$ is less than the area change threshold, it is determined that the connected region $A_{ij}$ is a defect region.

For example, if all the area change rate corresponding to the connected region $A_{ij}$ are less than the area change threshold, it is determined that the connected region $A_{ij}$ is a defect region.

As for a defect region in the screen to be detected, whether it is a bright defect region or a dark defect region, a brightness value at an edge of the defect region is significantly different from a brightness value of a non-defect region surrounding the defect region, that is, the gray values of the defect and the non-defect region are greatly different. In this case, when binary images are obtained through segmentation based on gray thresholds that are gradually changed, areas of certain corresponding connected regions in the binary images may be relatively stable in a case where the gray thresholds are within a certain range.

For example, gray values of image pixels in a certain defect region of the image of the screen to be detected are 200, and gray values of image pixels in the non-defect region of the image of the screen to be detected are 150. The step is selected to be 2 when the segmentation is performed by using different gray thresholds, and the gray thresholds are 152, 154, . . . , 196, 198. In a case where the binary image is obtained according to the gray threshold, if a gray value of a certain image pixel in the fused image is greater than the gray threshold, the gray value of the image pixel is set to 255, and if the gray value of the image pixel is less than or equal to the gray threshold, the gray value of the image pixel is set to 0. Then in all binary images, the gray values of the image pixels in the defect region are all 255, and the gray values of the image pixels in the non-defect region are all 0. It will be seen that, as for all gray thresholds, the area of the connected region formed by the defect region is unchanged, that is, the area of the connected region is stable, and an edge of the connected region is clear. Therefore, in a case where all the area change rates corresponding to the connected region are less than the preset area change threshold, it can be determined that the connected region is a defect region. Optionally, the area change threshold may be selected according to actual needs.

As for the image of the screen to be detected, if the image does not have a defect, a change range of the gray values of the image is small. In this case, when the binary images are obtained through segmentation by using gray thresholds that are gradually changed, areas of corresponding connected regions of the plurality of binary images will also be constantly changed.

For example, the gray values of the image pixels in a region of the image of the screen to be detected are all in a range from 149 to 152. In a case where the step is selected to be 1 to perform segmentation by using the gray thresholds, the gray thresholds are 150 and 151. If a gray value of a certain image pixel in the fused image is greater than the gray threshold, the gray value of the image pixel is set to 255, and if the gray value of the image pixel is less than or equal to the gray threshold, the gray value of the image pixel is set to 0. Thus, two binary images may be obtained according to the gray thresholds. Since the gray values of the image pixels in the fused image may be uniformly distributed, positions of the connected regions in the two obtained binary images may not correspond to each other, and areas of the connected regions may also change a lot.

In S203, an outer bounding polygon of each defect region is obtained.

For example, a polygon surrounding the defect region is provided as the outer bounding polygon. For example, as shown in FIGS. 4A and 4C, the outer bounding polygon is a rectangle. Other polygons may also be selected according to needs, such as triangles, pentagons, etc.

In S204, clustering calculation is performed on the outer bounding polygon to obtain at least one defective image pixel.

Figure 4B:
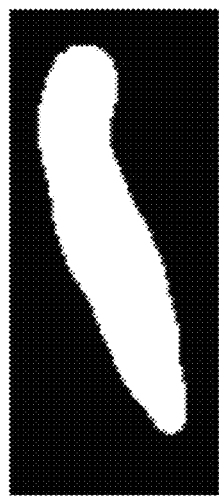
FIG. 4B is a schematic diagram of a region obtained by performing clustering calculation on the first defect region shown in FIG. 4A, according to some embodiments.
Figure 4C:
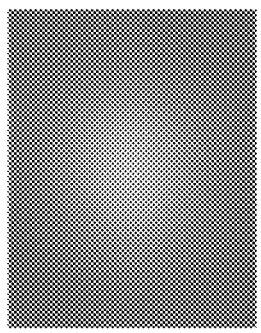
FIG. 4C is a grayscale diagram of a second defect region, according to some embodiments.
Figure 4D:
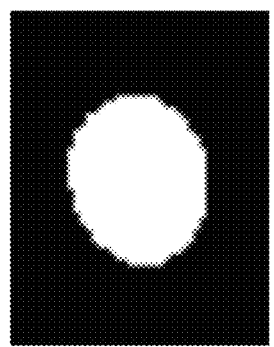
FIG. 4D is a schematic diagram of a region obtained by performing clustering calculation on the second defect region shown in FIG. 4C, according to some embodiments.

For example, a clustering algorithm is used to perform clustering calculation on each outer bounding polygon to obtain a more accurate contour of the defect region, as shown in FIG. 4B and FIG. 4D, that is, to obtain an accurate position of the defective image pixel. For example, the cluster algorithm may be a k-means clustering algorithm or the like. In addition, in the embodiments, there are only two types of defect and background (i.e., k is equal to 2), and since an area of the outer bounding polygon is generally small, an operation speed of the algorithm is quite fast when the clustering calculation is performed, which may improve the detection efficiency of the screen.

In S205, defect determination is performed on the at least one defective image pixel to obtain a category of the at least one defective image pixel.

In some examples, the S205 includes S401 to S403.

In S401, a center point gray value of a center image pixel of the outer bounding polygon and corner point gray values of corner image pixels of the outer bounding polygon are obtained.

The corner point gray value is a gray value of a pixel at an angle between two adjacent edges of the outer bounding polygon.

In S402, an average gray value of the corner point gray values is calculated.

For example, the outer bounding polygon is an outer bounding rectangle, and gray values of pixels at the four corners of the outer bounding rectangle are $pixel_{upperleft}$, $pixel_{upperright}$, $pixel_{lowerleft}$, and $pixel_{lowerright}$, and the average gray value of the corner point gray values of the outer bounding rectangle is $(pixel_{upperleft}+pixel_{upperright}+pixel_{lowerleft}+pixel_{lowerright})/4$.

In S403, a relationship between the average gray value and the center point gray value is determined. If the average gray value is less than the center point gray value, it is determined that the at least one defective image pixel is a bright defective image pixel; and if the average gray value is greater than the center point gray value, it is determined that the at least one defective image pixel is a dark defective image pixel.

In the above embodiments, since the center image pixel of the outer bounding polygon is in the defect region and the corner image pixels are in the non-defect region, a brightness of the defect region is higher than a brightness of the non-defect region if the average gray value of the corner point gray values is less than the center point gray value, that is, the defective image pixel in the defect region is a bright defective image pixel. As shown in FIG. 5, the defect region 51 is a bright defect region. Similarly, if the average gray value of the corner point gray values is greater than the center point gray value, a brightness of the defect region is lower than a brightness of the non-defect region, that is, the defective image pixel is a dark defective image pixel. As shown in FIG. 5B, the defect region 52 is a dark defect region. A category of the defective image pixel may be simply and conveniently determined through the method described in the embodiment, thereby determining a defect category of the defective sub-pixel in the screen to be detected.

In some embodiments, between the S103 and the S104, the method further includes: obtaining a plurality of adjacent image pixels in a neighborhood range of each image pixel in the fused image by taking the image pixel as a center pixel; calculating a variance of pixel values of the plurality of adjacent image pixels; and replacing a pixel value of the center pixel with the variance of pixel values.

For example, as for the image pixel pixel$_{center}$ in the fused image, 25 image pixels in a 5×5 neighborhood range of the image pixel are selected, then a variance value $\overline{pixel}$ of the 25 image pixels is calculated, and finally the pixel value of the image pixel pixel$_{center}$ is replaced with the variance value $\overline{pixel}$. In this way, non-uniformity of the background is eliminated by utilizing the difference between the pixels, so that the subsequent defect detection is more accurate and more effective.

It will be noted that the method for detecting a screen as described in the embodiments of the present disclosure may be performed by a single device, such as a computer or a server. The method provided by the embodiments of the present disclosure may also be applied to a distributed scenario, and is implemented through mutual cooperation, of a plurality of devices. In a case of such a distributed scenario, one of the plurality of devices may only perform one or more steps in the method provided by the embodiments of the present disclosure, and the plurality of devices may interact with each other to perform the method.

Figure 6:
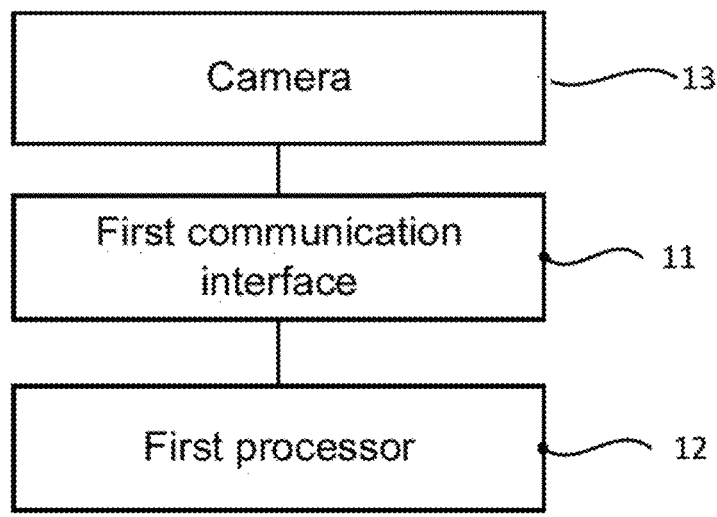
FIG. 6 is a block diagram of an apparatus for detecting a screen, according to some embodiments.

Some embodiments of the present disclosure provide an apparatus for detecting a screen. As shown in FIG. 6, the apparatus includes a first communication interface 11 and at least one first processor 12 connected to the first communication interface 11. The at least one first processor 12 may include one first processor 12 or include a plurality of first processors 12.

The first communication interface 11 is configured to receive an image of a screen to be detected.

For example, the apparatus of detecting the screen further includes a camera 13 configured to obtain the image of the screen to be detected. The camera 13 is, for example, an industrial camera.

For example, the first communication interface 1 is configured to receive the image of the screen to be detected transmitted by the industrial camera. A communication between the first communication interface 11 and the industrial camera may be realized in a wired manner (e.g., USB, network cable, etc.), or in a wireless manner (e.g., mobile network, WIFI, Bluetooth, etc.).

The at least one first processor 12 is configured to: perform Gabor filtering on the image of the screen to be detected to obtain a plurality of Gabor filtered images; perform image fusion on the plurality of Gabor filtered images to obtain a fused image; segment the fused image by using different gray thresholds to obtain segmented images, wherein a value range of the different gray thresholds is within a gray value range of the fused image; and perform defect detection according to the segmented images to determine whether there is a defective sub-pixel in the screen to be detected.

The first processor 12 may be implemented by using a general purpose central processing unit (CPU), a microprocessor, an application specific integrated circuit (ASIC), or one or more integrated circuits.

In some embodiments, the at least one, first processor 12 is configured to perform Gabor filtering in a first direction and a second direction on the image of the screen to be detected to obtain a first Gabor filtered image and a second Gabor filtered image respectively. The first direction is perpendicular to the second direction. A wavelength of a Gabor filter for obtaining the first Gabor filtered image is the number of image pixels between centers of adjacent sub-pixels of the screen to be detected in the first direction. A wavelength of a Gabor filter for obtaining the second Gabor filtered image is the number of image pixels between centers of adjacent sub-pixels of the screen to be detected in the second direction.

In some embodiments, the at least one first processor 12 is configured to perform the image fusion on the first Gabor filtered image and the second Gabor filtered image by a square fusion method. A formula of the square fusion method is, $$I=\sqrt{I_1^2+I_2^2}$$

where I represents a gray value of any image pixel in the fused image, $I_1$ represents a gray value of a corresponding image pixel in the first Gabor filtered image, and $I_2$ represents a gray value of a corresponding image pixel in the second Gabor filtered image.

In some embodiments, the at least one first processor 12 is configured to: perform threshold segmentation on the fused image based on each of the different gray thresholds to obtain a plurality of binary images in one-to-one correspondence with the different gray thresholds; obtain at least one defect region according to the plurality of binary images; obtain an outer bounding polygon of each defect region; perform clustering calculation on the outer bounding polygon to obtain at least one defective image pixel; and perform defect determination on the at least one defective image pixel to obtain a category of the at least one defective image pixel.

In some embodiments, the at least one first processor 12 is configured to: obtain a minimum gray value and a maximum gray value of the fused image; sequentially select different gray thresholds between the minimum gray value and the maximum gray value according to a preset step; perform threshold segmentation on the fused image by using each of the different gray thresholds to obtain a plurality of binary images; calculate areas of connected regions in the plurality of binary images; as for any connected region in any binary image, determine whether an area change rate of corresponding connected regions in binary images corresponding to any two adjacent gray thresholds is less than a preset area change threshold, wherein the area change rate of the corresponding connected regions is a ratio of an absolute value of a difference between an area of a corresponding connected region in a binary image corresponding to a larger gray threshold of the two adjacent gray thresholds and an area of a corresponding connected region in a binary image corresponding to a smaller gray threshold of the two adjacent gray thresholds to the area of the corresponding connected region in the binary image corresponding to the smaller gray threshold of the two adjacent gray thresholds; and if at least one area change rate corresponding to the any connected region is less than the area change threshold, determine that the any connected region is a defect region.

In some examples, before determining whether an area change rate of corresponding connected regions in binary images corresponding to any two adjacent gray thresholds is less than a preset area change threshold, the at least one first processor 12 is further configured to determine whether an area of any connected region in any binary image is less than a preset area threshold. If yes, as for the connected region, the at least one first processor 12 is further configured to determine whether an area change rate of corresponding connected regions in binary images corresponding to any two adjacent gray thresholds is less than the preset area change threshold.

In some embodiments, the at least one first processor 12 is configured to: for each gray threshold: as for each image pixel in the fused image, determine whether a gray value of the image pixel is greater than the gray threshold; if the gray value of the image pixel is greater than the gray threshold, set the gray value of the image pixel as a first gray value; and if the gray value of the image pixel is less than or equal to the gray threshold, set the gray value of the image pixel as a second gray value.

In some embodiments, the at least one first processor 12 is configured to: obtain a center point gray value of a center image pixel of the outer bounding polygon and corner point gray value of corner image pixels of the outer bounding polygon, calculate an average gray value of the corner point gray values; determine a relationship between the average gray value and the center point gray value; if the average gray value is less than the center point gray value, determine that the at least one defective image pixel is a bright defective image pixel; and if the average gray value is greater than the center point gray value, determine that the at least one defective image pixel is a dark defective image pixel.

In some embodiments, before segmenting the fused image, the at least one first processor 12 is further configured to: obtain a plurality of adjacent image pixels in a neighborhood range of each image pixel in the fused image by taking the image pixel as a center image pixel; calculate a variance of pixel values of the plurality of adjacent image pixels; and replace a pixel value of the center image pixel with the variance of pixel values.

The apparatus in the above embodiments has the same beneficial effects of the corresponding method embodiments, and details are not described herein again.

Some embodiments of the present disclosure provide an electronic device. The electronic device includes a memory, a second processor and a computer program that is stored in the memory and is executable on the second processor. The computer program includes computer instructions. The method for detecting the screen as described in the above embodiments is implemented when the computer instructions are executed by the second processor.

Figure 7:
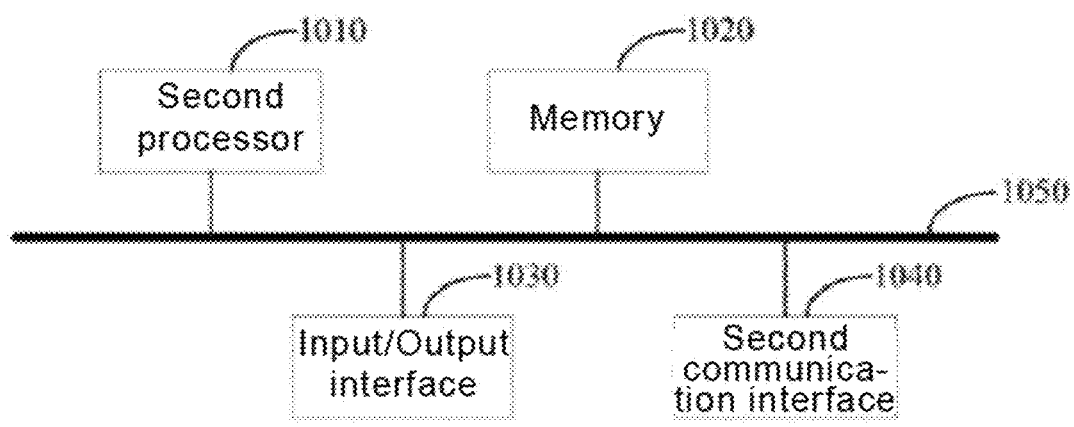
FIG. 7 is a schematic diagram of a hardware structure of an electronic device, according to some embodiments.

FIG. 7 shows a schematic diagram of a hardware structure of the electronic device provided by some embodiments of the present disclosure. The electronic device includes a second processor 1010, a memory 1020, an input/output interface 1030, a second communication interface 1040, and a bus 1050. The second processor 1010, the memory 1020, the input/output interface 1030, and the communication interface 1040 are communicatively coupled to each other inside the device through the bus 1050.

The second processor 1010 may be implemented by using a general purpose central processing unit (CPU), a microprocessor, an application specific integrated circuit (ASIC), or one or more integrated circuits for executing related computer instructions to implement the technical solutions provided by the embodiments of the present disclosure.

The memory 1020 may be implemented in a form of a read only memory (ROM), a random access memory (RAM), a static storage device, or a dynamic storage device. The memory 1020 may store an operating system and other application programs. When the technical solutions provided by the embodiments of the present disclosure are implemented in software or firmware, related program codes are stored in the memory 1020, and are called and executed by the second processor 1010.

The input/output interface 1030 is used to connect an input/output module to realize information input and output. The input/output module may be configured as a component in the device (not shown in the figure), or may be externally connected to the device to provide corresponding functions. Input devices may include keyboards, mice, touch screens, microphones, various sensors, etc., and output devices may include displays, speakers, vibrators, indicators, etc.

The second communication interface 1040 is used to connect a communication module (not shown in the figure) to implement communication interaction between the device and other devices. The communication module may implement communication in a wired manner (e.g., USB, network cable, etc.), or in a wireless manner (e.g., mobile network, WIFI, Bluetooth, etc.).

The bus 1050 includes a path for transmitting information between various components of the device (e.g., the second processor 1010, the memory 1020, the input/output interface 1030 and the communication interface 1040).

It will be noted that, although the above device only shows the second processor 1010, the memory 1020, the input/output interface 1030, the second communication interface 1040, and the bus 1050, in a specific implementation process, the device may also include other components necessary for normal operation. In addition, those skilled in the art can understand that the above device may only include components necessary to implement the solutions of the embodiments of the present disclosure, and does not necessarily include all the components shown in the figures.

It will be noted that the first communication interface 11 and the second communication interface 1040 may be a same communication interface. The first processor 12 and the second processor 1010 may be a same processor.

Some embodiments of the present disclosure provide a non-transitory computer-readable storage medium. The non-transitory computer-readable storage medium stores computer instructions. The computer instructions are used to cause a computer to execute the method for detecting the screen as described in any embodiment.

The computer-readable medium in the embodiments includes permanent and non-permanent, removable and non-removable media, and may implement information storage by any method or technique. The information may be computer-readable instructions, data structures, program modules, or other data. The computer storage media includes, but is not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, compact disc read-only memory (CD-ROM), digital versatile disc (DVD) or other optical storage, magnetic tape cartridges, tape disk storage or other magnetic storage devices, or any other non-transmission media, which may be used to store information that may be accessed by a computing device.

Those of ordinary skill in the art will understand that the discussion of any of the above embodiments is merely exemplary and is not intended to imply that the scope of the disclosure (including the claims) is limited to these examples. Within the idea of the present disclosure, technical features in the above embodiments or different embodiments may also be combined, steps may be implemented in any order. There are many other variations in different aspects of the present disclosure as described above, which are not provided in the details for the sake of brevity.

In addition, in order to simplify the description and discussion, and not to obscure the present disclosure, well-known power/ground connections to integrated circuit (IC) chips and other components may or may not be shown in the provided drawings. In addition, the apparatus may be shown in a block diagram to avoid obscuring the disclosure. Moreover, the fact is also taken into account that the details with respect to the implementation of these apparatuses shown in a block diagram are highly dependent on the platform in which, the disclosure will be implemented (i.e., these details should be completely within the understanding of those skilled in the art). In a case where specific details (e.g., circuits) are illustrated to describe exemplary embodiments of the present disclosure, it will be apparent to those skilled in the art that the disclosure may also be implemented without these specific details or with variation of these specific details. Therefore, these descriptions should be considered as illustrative instead of restrictive.

Although the present disclosure has been described in combination with specific embodiments thereof, many alternatives, modifications, and variations of these embodiments will be apparent to those skilled in the art according to the foregoing description. For example, other memory architectures (e.g., the dynamic random access memory (DRAM)) may use the above described embodiments.

The embodiments of the present disclosure are intended to cover all alternatives, modifications, and variations that fall within the broad scope of the appended claims. Therefore any omissions, modifications, equivalent substitutions, improvements, and the like that are made within the spirit and scope of the present disclosure shall be included in the scope of the present disclosure.

What is claimed is:

1. A method for detecting a screen, the method comprising:
    obtaining an image of a screen to be detected;
    performing Gabor filtering on the image of the screen to be detected to obtain a plurality of Gabor filtered images;
    performing image fusion on the plurality of Gabor filtered images to obtain a fused image;
    segmenting the fused image by using different gray thresholds to obtain segmented images, which including performing threshold segmentation on the fused image based on each of the different gray thresholds to obtain a plurality of binary images in one-to-one correspondence with the different gray thresholds; wherein a value range of the different gray thresholds is within a grays value range of the fused image; and
    performing defect detection according to the segmented images to determine whether there is a defective sub-pixel in the screen to be detected, which including:
    obtaining at least one defect region according to the plurality of binary images; obtaining an outer bounding polygon of each defect region; performing clustering calculation on the outer bounding polygon to obtain at least one defective image pixel; and performing defect determination on the at least one defective image pixel to obtain a category of the at least one defective image pixel;
    wherein performing threshold segmentation on the fused image based on each of the different gray thresholds to obtain a plurality of binary images in one-to-one correspondence with the different gray thresholds, includes:
        obtaining a minimum gray value and a maximum way value of the fused image;
        sequentially selecting different gray thresholds between the minimum gray value and the maximum gray value according to a preset step; and
        performing threshold segmentation on the fused image by using each of the different gray thresholds to obtain a plurality of binary images,
    and wherein obtaining at least one defect region according to the plurality of binary images, includes:
        calculating areas of connected regions in the plurality of binary images;
        as for any connected region in any binary image, determining whether an area change rate of corresponding connected regions in binary images corresponding to any two adjacent gray thresholds is less than a preset area change threshold, wherein the area change rate of the corresponding connected regions is a ratio of an absolute value of a difference between an area of a corresponding connected region in a binary image corresponding to a larger gray threshold of the two adjacent gray thresholds and an area of a corresponding connected region in a binary image corresponding to a smaller gray threshold of the two adjacent gray thresholds to the area of the corresponding connected region in the binary image corresponding to the smaller gray threshold of the two adjacent gray thresholds; and
        if at least one area change rate corresponding to the any connected region is less than the area change threshold, determining that the any connected region is a defect region.

2. The method according to claim 1, wherein performing Gabor filtering on the image of the screen to be detected to obtain a plurality of Gabor filtered images, includes:
    performing Gabor filtering in a first direction and a second direction on the image of the screen to be detected to obtain a first Gabor filtered image and a second Gabor filtered image, respectively, wherein the first direction is perpendicular to the second direction, a wavelength of a Gabor filter for obtaining the first Gabor filtered image is a number of image pixels between centers of adjacent sub-pixels of the screen to be detected in the first direction, a wavelength of a Gabor filter for obtaining the second Gabor filtered image is a number of image pixels between centers of adjacent sub-pixels of the screen to be detected in the second direction.

3. The method according to claim 2, wherein performing image fusion on the plurality of Gabor filtered images to obtain a fused image, includes:
    performing image fusion on the first Gabor filtered image and the second Gabor filtered image by a square fusion method, wherein a formula of the square fusion method is, $$I=\sqrt{I_1^2+I_2^2}$$

where I represents a gray value of any image pixel in the fused image, I represents a gray value of a corresponding image pixel in the first Gabor filtered image, and $I_2$ represents a gray value of a corresponding image pixel in the second Gabor filtered image.

4. The method according to claim 1, wherein before determining whether an area change rate of corresponding connected regions in binary images corresponding to any two adjacent gray thresholds is less than a preset area change threshold, obtaining at least one defect region according to the plurality of binary images, further includes:
    determining whether an area of any connected region in any binary image is less than a preset area threshold; and
    if yes, as for the connected region, determining whether an area change rate of corresponding connected regions in binary images corresponding to any two adjacent gray thresholds is less than the preset area change threshold.

5. The method according to claim 1, wherein performing threshold segmentation on the fused image by using each of the different gray thresholds to obtain a plurality of binary images, includes:
for each gray threshold:
as for each image pixel in the fused image, determining whether a gray value of the image pixel is greater than the gray threshold;
if the gray value of the image pixel is greater than the gray threshold, setting the gray value of the image pixel as a first gray value, and
if the gray value of the image pixel is less than or equal to the gray threshold, setting the gray value of the image pixel as a second gray value.

6. The method according to claim 1, wherein performing defect determination on the at least one defective image pixel to obtain a category of the at least one defective image pixel, includes:
obtaining a center point gray value of a center image pixel of the outer bounding polygon and corner point gray values of corner image pixels of the outer bounding polygon;
calculating an average gray value of the corner point gray values;
determining a relationship between the average gray value and the center point gray value;
if the average gray value is less than the center point gray value, determining that the at least one defective image pixel is a bright defective image pixel; and
if the average gray value is greater than the center point gray value, determining that the at least one defective image pixel is a dark defective image pixel.

7. The method according to claim 1, wherein before segmenting the fused image, the method further comprises:
obtaining a plurality of adjacent image pixels in a neighborhood range of each image pixel in the fused image by taking the image pixel as a center image pixel;
calculating a variance of pixel values of the plurality of adjacent image pixels; and
replacing a pixel value of the center image pixel with the variance of pixel values.

8. An apparatus for detecting a screen, comprising:
a first communication interface configured to receive an image of a screen to be detected; and
at least one first processor configured to:
perform Gabor filtering on the image of the screen to be detected to obtain a plurality of Gabor filtered images;
perform image fusion on the plurality of Gabor filtered images to obtain a fused image;
segment the fused image by using different gray thresholds to obtain segmented images, wherein a value range of the different gray thresholds is within a gray value range of the fused image; and
perform defect detection according to the segmented images to determine whether there is a defective sub-pixel in the screen to be detected;
wherein the at least one first processor is further configured to:
perform threshold segmentation on the fused image based on each of the different gray thresholds to obtain a plurality of binary images in one-to-one correspondence with the different gray thresholds;
obtain at least one defect region according to the plurality of binary images;
obtain an outer bounding polygon of each defect region;
perform clustering calculation on the outer bounding polygon to obtain at least one defective image pixel; and
perform defect determination on the at least one defective image pixel to obtain a category of the at least one defective image pixel;
wherein the at least one first processor is further configured to:
obtain a minimum gray value and a maximum gray value of the fused image;
sequentially select different gray thresholds between the minimum gray value and the maximum gray value according to a preset step;
perform threshold segmentation on the fused image by using each of the different gray thresholds to obtain a plurality of binary images;
calculate areas of connected regions in the plurality of binary images; and
as for any connected region in any binary image, determine whether an area change rate of corresponding connected regions in binary images corresponding to any two adjacent gray thresholds is less than a preset area change threshol wherein the area change rate of the corresponding connected regions is a ratio of an absolute value of a difference between an area of a corresponding connected region in a binary image corresponding to a larger gray threshold of the two adjacent gray thresholds and an area of a corresponding connected region in a binary image corresponding to a smaller gray threshold of the two adjacent gray thresholds to the area of the corresponding connected region in the binary image corresponding to the smaller gray threshold of the two adjacent gray thresholds; and
if at least one area change rate corresponding to the any connected region is less than the area change threshold, determine that the any connected region is a defect region.

9. The apparatus according to claim 8, wherein the at least one first processor is configured to perform Gabor filtering in a first direction and a second direction on the image of the screen to be detected to obtain a first Gabor filtered image and a second Gabor filtered image, respectively, wherein the first direction is perpendicular to the second direction, a wavelength of a Gabor filter for obtaining the first Gabor filtered image is a number of image pixels between centers of adjacent sub-pixels of the screen to be detected in the first direction, and a wavelength of a Gabor filter for obtaining the second Gabor filtered image is a number of image pixels between centers of adjacent sub-pixels of the screen to be detected in the second direction.

10. The apparatus according to claim 8, wherein the at least one first processor is further configured to:
determine whether an area of any connected region in any binary image is less than a preset area threshold before determining whether an area change rate of corresponding connected regions in binary images corresponding to any two adjacent gray thresholds is less than a preset area change threshold, and
if yes, as for the connected region, determine whether an area change rate of corresponding connected regions in binary images corresponding to any two adjacent gray thresholds is less than the preset area change threshold.

11. The apparatus according to claim 8, wherein the at least one first processor is configured to:
for each gray threshold:
as for each image pixel in the fused image, determine whether a gay value of the image pixel is greater than the gray threshold;
if the gray value of the image pixel is greater than the gray threshold, set the gray value of the image pixel as a first gray value, and
if the gray value of the image pixel is less than or equal to the gray threshold, set the gray value of the image pixel as a second gray value.

12. The apparatus according to claim 8, wherein the at least one first processor is configured to:
obtain a center point gay value of a center image pixel of the outer bounding polygon and corner point gray values of corner image pixels of the outer bounding polygon;
calculate an average gray value of the corner point gray values;
determine a relationship between the average gray value and the center point gray value;
if the average gray value is less than the center point gray value, determine that the at least one defective image pixel is a bright defective image pixel; and
if the average gray value is greater than the center point gray value, determine that the at least one defective image pixel is a dark defective image pixel.

13. The apparatus according to claim 8, the at least one processor is further configured to:
obtain a plurality of adjacent image pixels in a neighborhood range of each image pixel in the fused image by taking the image pixel as a center image pixel;
calculate a variance of pixel values of the plurality of adjacent image pixels; and
replace a pixel value of the center image pixel with the variance of pixel values.

14. An electronic device, comprising a memory, a second processor and a computer program that is stored in the memory and is executable on the second processor that, when executing the computer program, implements the method for detecting the screen according to claim 1.

15. A non-transitory computer-readable storage medium, wherein the storage medium stores computer instructions, which are used for causing a computer to execute the method for detecting the screen according to claim 1.

* * * * *

UNITED STATES PATENT AND TRADEMARK OFFICE
CERTIFICATE OF CORRECTION

PATENT NO. : 11,334,981 B2
APPLICATION NO. : 16/850778
DATED : May 17, 2022
INVENTOR(S) : Xiaolei Liu et al.

It is certified that error appears in the above-identified patent and that said Letters Patent is hereby corrected as shown below:

In the Claims

Figure 5A:
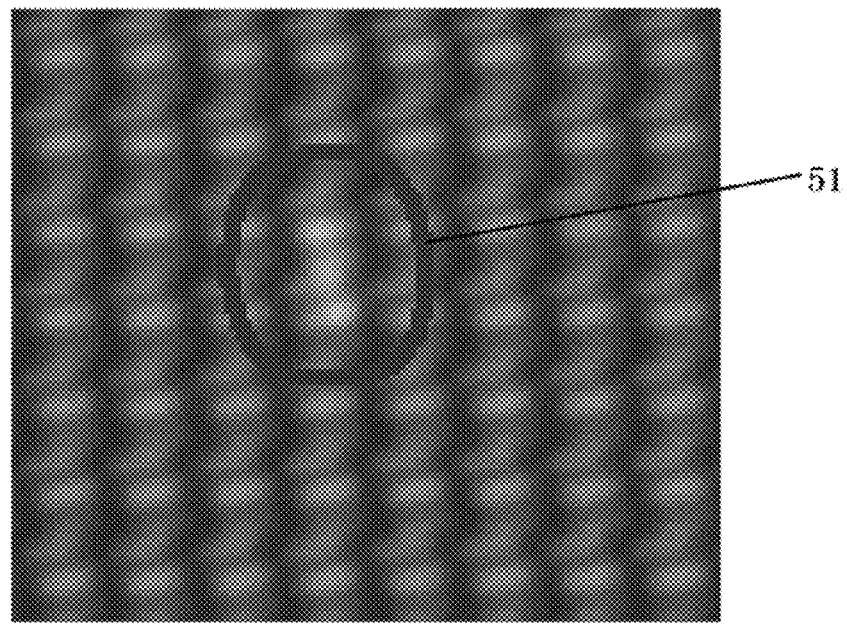
FIG. 5B is a schematic diagram showing exemplary dark defective image pixels.
Figure 5B:
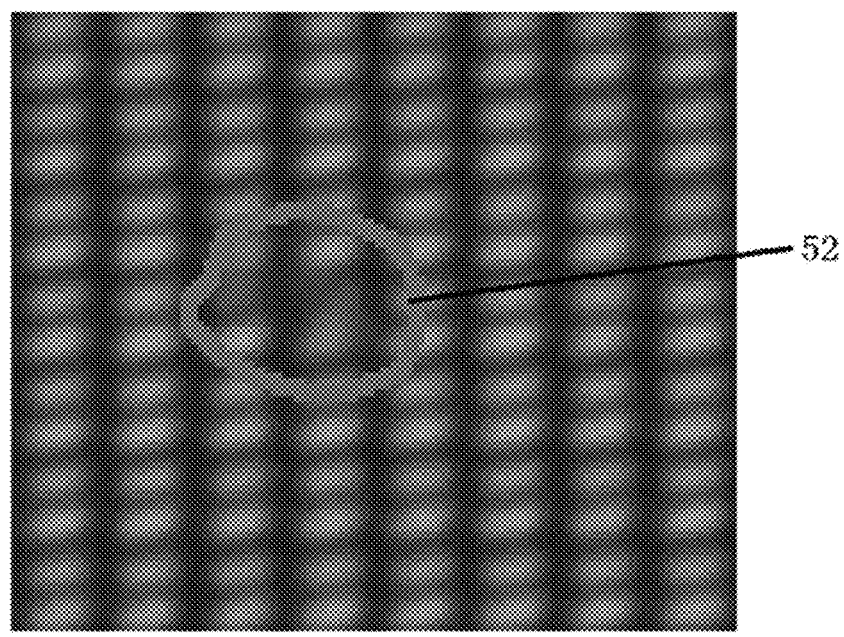

In Column 5, Line 42, delete "FIG. 6A" and insert -- FIG. 5A --.

Signed and Sealed this
Thirty-first Day of January, 2023

Katherine Kelly Vidal
Director of the United States Patent and Trademark Office